Patented July 31, 1951

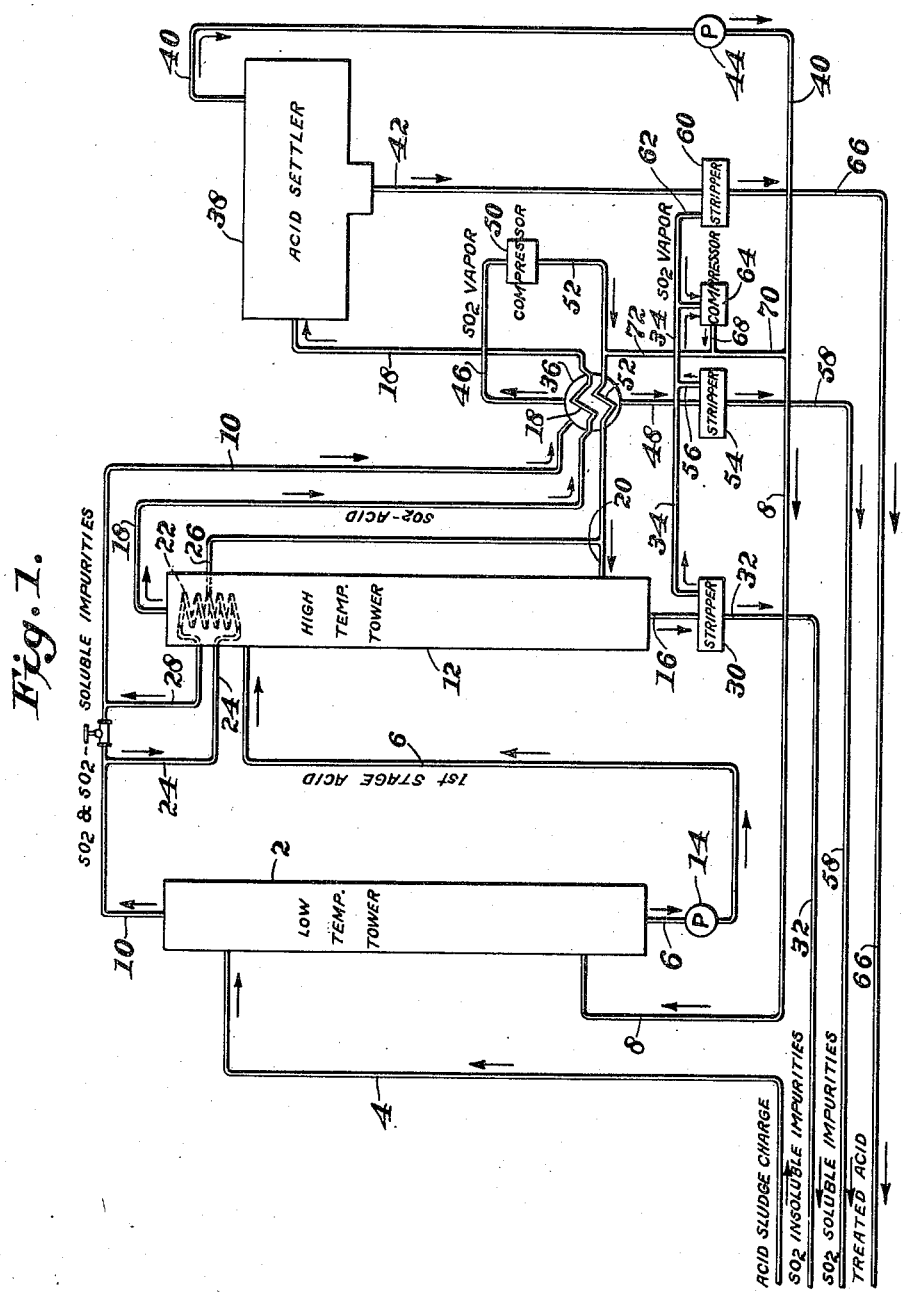

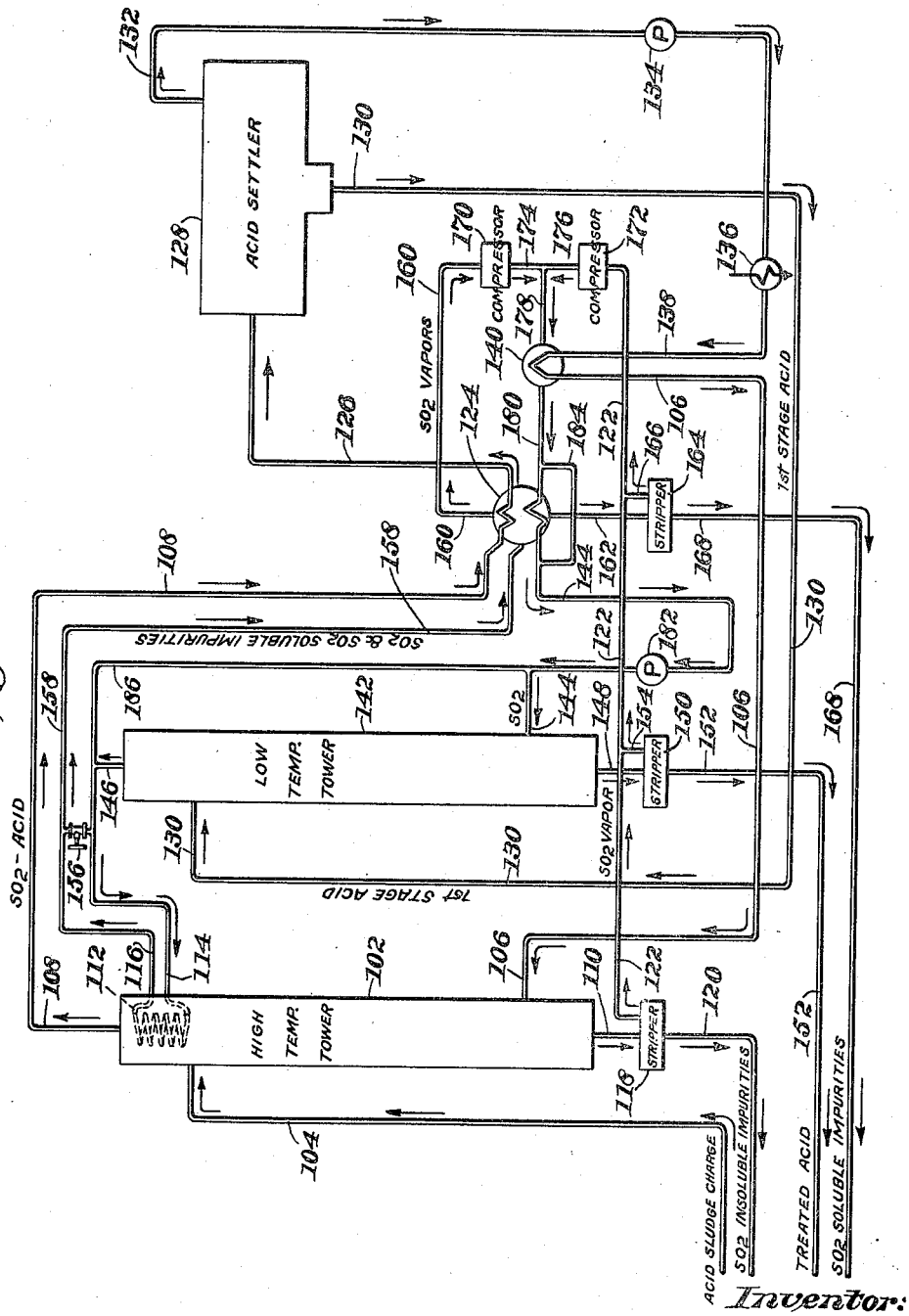

2,562,608

UNITED STATES PATENT OFFICE 2,562,608

PURIFICATION AND RECOVERY OF ACIDIC MATERIALS

Leslie U. Franklin, Port Arthur, Tex., assignor to Gulf Oil Corporation, Pittsburgh, Pa., a corporation of Pennsylvania Application March 7, 1946, Serial No. 652,704

4 Claims. (Cl. 23—172)

This invention relates to the purification and recovery of acidic materials. More particularly, the invention is concerned with a procedure for the recovery of the acidic components of sludges resulting from the treatment of hydrocarbon mixtures with acidic materials and for the purification of sulphuric acid.

Large quantities of acidic mixtures containing acid components, commonly called acid sludges, are obtained from various petroleum treatment procedures. Thus, large quantities of waste sulphuric acid in the form of acid sludges are obtained as a result of sulphuric acid catalyzed hydrocarbon alkylations.

Such acidic mixtures are composed predominantly of an acidic component, e. g., sulphuric acid, plus minor quantities of inorganic or organic matter which serve to contaminate and dilute the active ingredient. Generally, these acidic mixtures are not suitable for further use in the treatment of petroleum products, but their active acidic material may be utilized for further petroleum treatment provided that the active material is separated and recovered from the contaminating ingredients of the acidic sludges.

A principal object of the present invention is the provision of a procedure for the the purification and recovery of acidic materials. A further object is the provision of a process for the purification of acid sludges resulting from petroleum treatment procedures and for the recovery of the acidic component of these sludges in a high degree of purity in an economical and efficient manner. A still further object is the purification of sulphuric acid sludges resulting from hydrocarbon alkylation procedures which will yield the recovered sulphuric acid in a sufficient degree of purification to permit its re-use in the alkylation process by a procedure which does not involve the expensive steps of hydrolysis, concentration and fortification or the steps of complete oxidation of the acid sludge, gas purification, catalytic conversion and fortification.

Another object is the provision of a simple, continuous process for the purification and recovery of sulphuric acid from acid sludges resulting from petroleum treatment procedures. A further object is the provision of a process for the removal of emulsion-forming impurities from impure sulphuric acid resulting from hydrocarbon alkylation procedures so as to decrease the tendency of the sulphuric acid to form difficulty resolvable emulsions. Other objects and the entire scope of applicability of this invention will become apparent from the detailed description given hereinafter.

These objects are accomplished according to the process of the present invention by contacting impure acidic mixtures resulting from petroleum treatment procedures with liquid sulphur dioxide under proper conditions so that the impurities in the mixtures are removed therefrom and the acidic or principal component is recovered in substantially pure form.

The success of the present invention depends primarily upon the discovery that acidic sludges from petroleum treatment procedures, and in particular, sulphuric acid sludges, may be freed of their contaminating impurities by controlled extraction with liquid sulphur dioxide.

It has been found that sulphuric acid sludges, such as those resulting from hydrocarbon alkylation procedures, are composed of sulphuric acid, sulphuric acid hydrates, liquid sulphur-dioxide-soluble impurities, which are apparently soluble in sulphuric acid and are characterized by their ease of oxidation, red color and transparent solution, when dissolved in liquid sulphur dioxide, and liquid sulphur-dioxide-insoluble impurities which appear to exist in part as a solution in the sulphuric acid and in part as a colloidal suspension in the acid and characterized by their black color, high viscosity and general tarry appearance. This invention further involves the discovery that sulphuric acid or its hydrates are soluble to an appreciable extent in warm liquid sulphur dioxide, and relatively less soluble in cold liquid sulphur dioxide, while the differences in respective solubility of sulphuric acid and the contaminants of the subject acid sludges are sufficiently large to permit the separation of the impurities from the impure sulphuric acid.

The manner in which these discoveries may be utilized for purification of acid sludges may be briefly stated as follows: The acid sludge to be treated is contacted with liquid $SO_2$ under such conditions that the acidic component of the sludge is separated from the undesirable impurities and the purified acidic material is recovered in substantially pure form. The contacting of the acid sludge with liquid $SO_2$ under suitable conditions may be effected by two different general series of operational steps.

In the first of these series of steps or schemes, the acid sludge is contacted with liquid $SO_2$ in a countercurrent manner at a temperature sufficiently low, e. g., 20° F., to permit the $SO_2$-soluble impurities of the sludge to dissolve in the liquid $SO_2$ without dissolving any appreciable quantity of sulphuric acid or its hydrates. The liquid $SO_2$ containing the dissolved impurities is separated from the treated acid sludge, subjected to evaporation to remove the dissolved impurities therefrom, compressed, condensed and recycled to the sludge contacting step.

The acid sludge which has been treated at the low temperature with liquid sulphur dioxide is then contacted in countercurrent manner with another portion of liquid sulphur dioxide at a temperature which is sufficiently high, e. g., 80° F., to dissolve substantially all of the sulphuric acid in the liquid $SO_2$. This $SO_2$ acid mixture is then separated from the insoluble impurities. Thereafter, the temperature of the $SO_2$ acid solution is lowered to a temperature sufficiently low, e. g., 20° F., to precipitate all the acid from the solution after which the precipitated acid is recovered, while the sulphur dioxide is recycled to the process step of contact at the elevated temperature with further partially treated sludge.

In the second scheme, the acid sludge is first contacted with liquid sulphur dioxide in a countercurrent manner at a temperature sufficiently high, e. g., 80° F., to insure the solution in the sulphur dioxide of substantially all of the acid, its hydrates and the $SO_2$ soluble impurities, while the undissolved $SO_2$ insoluble impurities are separated from the resulting solution. The resulting solution of $SO_2$ in acid is then cooled to a temperature sufficiently low, e. g., 20° F., to precipitate the dissolved acid from the solution while retaining in solution substantially all of the $SO_2$ soluble impurities. The precipitated acid is then contacted with further liquid sulphur dioxide in a countercurrent manner at a temperature sufficiently low, e. g., 20° F., to dissolve any of the $SO_2$ soluble impurities remaining in the acid without dissolving any appreciable quantity of the acid. Finally, the purified acid is separated from the liquid sulphur dioxide. The separated sulphur dioxide is distilled, compressed, condensed and recycled to the process for further contact at the indicated low temperature with further partially treated sludge.

For a more complete understanding of the process of this invention, reference is made to the attached drawings, in which Figure 1 is a diagrammatic view of apparatus suitable for use in conducting the first series of steps, scheme I, described above; and Figure 2 is a diagrammatic view of apparatus suitable for conducting the second series of steps, scheme II, described above.

Referring in detail to the drawings, there is illustrated in Figure 1 a packed tower 2, provided with a fluid inlet line 4, a fluid outlet line 6, a liquid $SO_2$ inlet line 8, and a liquid $SO_2$ solution outlet line 10. In this packed tower 2, the raw acid sludge to be treated is introduced through line 4 and caused to countercurrently contact recycled liquid $SO_2$ at a temperature of, for example 20° F., and a pressure of 20 pounds abs., passing up through the column from the inlet line 8 to the outlet line 10.

A second packed tower 12 is connected to the tower 2 by the fluid line 6, which line is provided with a pump 14. This second tower 12 is further provided with outlet lines 16 and 18, and inlet line 20. In addition, the top of the tower is provided with heat exchange coils 22, which are connected to permit liquid from line 24 or line 26 to be circulated therein and exit through line 28.

The partially treated sludge from tower 2 passes to the tower 12 through line 6 under the action of pump 14. In the packed tower 12, this partially treated sludge is caused to contact at elevated temperature and pressure, for example 80° F., and 65 pounds abs., recycled and distilled liquid $SO_2$ entering through line 20 and passing upward through the tower and out the exit line 18. As a result, substantially all of the sulphuric acid in the partially treated sludge entering the tower 12 through line 6 is dissolved in the liquid $SO_2$ passing through the tower 12 from inlet line 20. The resulting solution of the sulphuric acid in liquid $SO_2$ leaves the tower through the exit line 18, while the impurities from the acid sludge, which are insoluble in liquid $SO_2$, are separated and removed from the tower through line 16.

The exit line 16 of the tower 12 connects to a stripper 30 which is provided with exit lines 32 and 34. In the stripper the $SO_2$ insoluble impurities are separated from any dissolved liquid $SO_2$ by heating the materials therein. The stripped $SO_2$ insoluble materials are removed from the stripper through line 32, while the separated sulphur dioxide is removed as gas from the stripper through the gas line 34 and is eventually purified and recycled as is described later.

The $SO_2$/acid solution leaving tower 12 through line 18 passes to the heat exchanger 36 and then to the acid settling tank 38. This acid settling tank 38 is provided with exit fluid lines 40 and 42, the line 40 serving to remove liquid $SO_2$ from the tank and line 42 serving to conduct acid from the tank.

In passing through the heat exchanger 36, the $SO_2$/acid solution which leaves the tower 12 at a temperature of about 60° F. is further cooled to a temperature to about 15° to 20° F. Thus, this $SO_2$/acid mixture enters the acid settler 38 at a temperature of about 15° to 20° F. and a pressure of about 60 pounds abs. The reduction of temperature from that prevailing in the tower 12 to that in the settling tank 38 causes the acid dissolved in the solution to precipitate. The precipitated acid is removed from the settling tank through line 42, conducted to a stripper and finally conveyed to storage or is recycled to the petroleum treatment procedure. The supernatant liquid sulphur dioxide is removed from the acid settling tank through the line 40 under the action of pump 44 which recycles the supernatant $SO_2$ back to tower 2 through the line 8 into which line 40 connects.

The contact of the fresh acid sludge with liquid $SO_2$ in tower 2 at the indicated conditions results in the formation of a $SO_2$ solution of $SO_2$ soluble impurities from the acid sludge. This solution leaves the tower 2 through exit line 10 at a temperature of about 20° F., the major portion of this solution is conducted through line 10 to the heat exchanger 36, but a minor portion of the solution is by-passed through line 24 to the cooling coils 22 and then re-enters the main line 10 through the cooling coil return line 28. Thus, the cold solution by-passed through the cooling coils serves to cool the $SO_2$/acid solution exiting from the tower 12 through the line 18, as described above.

The solution passing from the tower 2 through line 10 enters the heat exchanger 36 at a lower pressure than that prevailing in the tower 2, e. g., 10 pounds abs. As a result of the low prevailing pressure, the sulphur dioxide in the solution is vaporized with the absorption of heat. This vaporization results in the production of $SO_2$ vapors which leave the heat exchanger through line 46 and unvaporized $SO_2$ soluble impurities which leave the heat exchanger through fluid line 48.

The $SO_2$ vapors pass through line 46 to the compressor 50, where they are compressed and liquefied and recycled to the heat exchanger 36 through line 52. Here, a portion of the heat of compression is removed and the liquefied sulphur dioxide is then conducted to the tower 12 through the line 20 to which line 52 connects. Line 20 is provided with by-pass line 26 which indirectly connects line 20 to line 10 through coils 22 and line 28. This by-pass line 26 permits a controlled amount of distilled liquid $SO_2$ to be charged to line 10 in order to maintain the necessary material balances between the separate stages of the process.

The unvaporized $SO_2$ soluble impurities pass from the exchanger 36 through line 48 to a stripper 54. In this stripper the unvaporized impurities are separated from any dissolved $SO_2$ by heating the mixture to a temperature of about 80° F. The sulphur dioxide vapors stripped from the impurities pass out of the stripper through line 56 which connects to line 34 leading from stripper 30. The stripped impurities exit from the stripper 54 through the removal line 58 and are conducted to storage or waste. Similarly, the settled acid which is removed from the settling tank 38 through line 42 is passed through a stripper 60, wherein any sulphur dioxide dissolved in the settled acid is removed by heating the acid to a temperature of about 80° F. Any $SO_2$ vaporized in stripper 60 is removed from the stripper through the exit line 62 which connects with line 34 and which, in turn, runs to the compressor 64. The stripped acid is removed from the stripper 60 through line 66 and is conducted to storage or recycled for petroleum product treatment.

The $SO_2$ vapors obtained from strippers 30, 54 and 60 through lines 34, 56 and 62 enter a compressor 64 where they are compressed and liquefied. The liquefied $SO_2$ leaves the compressor 64 through line 68 which splits into lines 70 and 72, the line 70 connecting to line 8 for conduction of liquid $SO_2$ to tower 2, while the line 72 connects to line 52 for passage of liquid $SO_2$ through heat exchanger 36 and then into line 20 for entrance into tower 12.

Figure 2 illustrates a form of apparatus which is useful in carrying out the second scheme of steps as indicated above for purification of acid sludges. This drawing shows a tower 102 provided with fluid inlet lines 104 and 106 and fluid outlet lines 108 and 110. The top of the tower is also provided with cooling coils 112 connected to the cooling coil inlet line 114 and the cooling coil outlet line 116. The tower 102 is operated at a temperature sufficiently high, e. g., 80° F., and a corresponding pressure, e. g. 65 pounds abs., to insure the solution of substantially all of the acid sludge entering the tower through the acid sludge charge line 104 in the liquid $SO_2$ passing up through the tower from the inlet line 106. The countercurrent contact of the acid sludge charge with the sulphur dioxide in tower 102 results in the formation of a solution of the acid in sulphur dioxide. This $SO_2$/acid solution leaves the tower through outlet line 108. At the same time, the impurities of the acid sludge, which are insoluble in liquid $SO_2$, pass downward through the tower and are removed therefrom through outlet line 110. The insoluble impurities are conveyed by line 110 to stripper 118, where any $SO_2$ dissolved in the resulting $SO_2$ insoluble impurities is removed therefrom by reduction of pressure upon the mixture. This stripping procedure results in the separation of $SO_2$ insoluble sludge impurities free from $SO_2$ which leaves the stripper through exit line 120 and $SO_2$ gas which leaves the stripper through gas line 122. The impurities are conveyed by line 120 to storage or waste, while the $SO_2$ vapors are conveyed by line 122 to a compressor unit and recycled in the system, as explained more fully below.

As indicated above, the tower 102 is preferably operated at a temperature of the order of 80° F. and a pressure of the order of 65 pounds absolute. Through the action of the cooling coils 120, the solution of $SO_2$ in acid leaving the tower 102 through fluid line 108 is cooled to a temperature of preferably 60° F. This partially cooled solution is then conveyed through the fluid line 108 to heat exchanger 124, where further heat is removed from the solution and its temperature reduced to preferably about 15° to 20° F. The mixture in this cool state is then conducted by fluid line 126 to an acid settling tank 128. As a result of the reduction of the temperature of the solution of $SO_2$ in acid, the acid in the solution is precipitated. The precipitated acid settles to the bottom of the acid settling tank and is removed therefrom through line 130, while the supernatant liquid $SO_2$ is decanted from the settling tank through line 132. The decanted $SO_2$ is conveyed by the line 132 under the action of pump 134 through heat exchanger 136 which serves to heat the liquid, thence through line 138 to heat exchanger 140 where the liquid sulphur dioxide becomes further heated, and is finally returned to the tower 102 through the fluid line 106 connecting the exchanger 140 with the tower 102.

The settled, partially treated acid issuing from the settling tank 128 is conveyed by the fluid line 130 to the packed tower 142. This tower is provided, in addition to the inlet line 130, with inlet line 144 and outlet lines 146 and 148.

The tower 142 is operated at a temperature sufficiently low so that the liquid $SO_2$ passing countercurrently upward through the tower from inlet 144 to outlet line 146 dissolves substantially none of the partially treated acid sludge passing countercurrently downward through the tower from inlet line 140 to outlet line 148, e. g., a temperature of the order of 20° F. and a corresponding pressure of the order of 20 pounds abs.

The countercurrent contact of partially treated sludge and liquid $SO_2$, at the conditions existing in tower 142, results in the production of purified acid which leaves the tower through exit line 148 and a solution of $SO_2$ soluble sludge impurities in liquid $SO_2$ which leaves the tower through the exit line 146. The purified acid is conveyed by the line 148 to a stripper 150 wherein any sulphur dioxide dissolved in the treated acid is removed as vapor by the application of heat to the treated acid. The $SO_2$ free acid is removed from the stripper through the fluid line 152 and is conveyed to storage or is recycled in further petroleum product treatment. The gaseous sulphur dioxide is removed from the stripper through the vapor line 154 which connects to the vapor line 122.

The solution of $SO_2$ soluble sludge impurities issuing from the top of tower 142 through the line of 146 is split in two portions by means of valve 156. One of these portions passes through the line 114 to the cooling coil 112 where this cold solution serves to remove heat from the $SO_2$/acid solution leaving tower 102, as is described above. The solution then passes through return line 116 where it is combined with the remainder of the solution and conveyed through the fluid line 158 to the heat exchanger 124. The heat exchanger 124 is operated so that the solution of SO₂ soluble impurities from tower 142 is maintained under a pressure of 10 pounds abs., while this solution is heated in the heat exchanger 124. As a result of this heat increase and pressure reduction, the sulphur dioxide in the solution is vaporized and separated from the unvaporized impurities as gaseous SO₂ through the vapor line 160. The unvaporized impurities are removed from the heat exchanger through the fluid line 162 and are conveyed to a stripper 164. In the stripper any SO₂ dissolved in the separated impurities is removed by vaporizing the sulphur dioxide. The vaporized sulphur dioxide is removed from the stripper through vapor line 166, while the sulphur dioxide free impurities are conveyed through the exit line 168 to storage or waste.

The SO₂ vapors generated in the heat exchanger 124 are conveyed by the vapor line 160 to a compressor 170 where they are compressed. The SO₂ vapors generated in the strippers 118, 150 and 164 are also compressed in a compressor 172. The compressed SO₂ from compressor 170 flows through fluid line 174 which joins with the fluid line 176 conducting the compressed SO₂ from compressor 172 to form the common fluid line 178 which conveys the combined streams of compressed sulphur dioxide to the heat exchanger 140. In the heat exchanger 140, a portion of the heat of compression is removed and the partially cooled liquid SO₂ is conveyed by line 180 to heat exchanger 124 where a further portion of the heat in the liquefied sulphur dioxide is removed. The cooled sulphur dioxide is then conveyed through the fluid line 144 under the action of pump 182 to the tower 142. The fluid line 180 is provided with a by-pass line 184 which permits a portion of the liquid sulphur dioxide from heat exchanger 140 to be by-passed around the heat exchanger 124, so that the final temperature of liquid sulphur dioxide conveyed to tower 142 may be accordingly controlled. Fluid line 144 is provided with a by-pass line 186 which permits a portion of the distilled SO₂ from the compressors to be combined with the SO₂ soluble impurities solution leaving tower 142 by line 146 in order to maintain the proper material balance in the separate stages of the process.

Apparatus for conduct of the present invention is illustrated in simplified form by Figures 1 and 2 and it will be understood that conventional automatic or manually controlled means may be employed for regulating and controlling rates of flow, pressures, and temperatures throughout the process. In particular, flow controllers, pressure controllers, and exchanger by-pass lines have not been shown in the interest of simplicity.

In one respect, it may be considered that the order of procedure for the extraction steps is reversed in the two schemes, that is, in scheme I, the first stage is conducted at low temperature to extract soluble impurities only, leaving the higher temperature second stage to separate the dissolved acid from the insoluble impurities, while in scheme II the first stage is conducted at a higher temperature to separate all SO₂ solubles (acid and impurities) from the insolubles, leaving the function of separating acid from soluble impurities to the steps conducted at low temperatures.

However, another difference in the two schemes is the purity of SO₂ contacted with the acid sludge in the separate process stages. In scheme I, the low temperature, first stage is charged with 100 per cent recycle SO₂ from the acid settler which has been once distilled since contacting SO₂ soluble impurities, but has not been distilled after precipitating the insolubles in the high temperature stage. The first stage (high temperature) of scheme II is charged with 100 per cent recycle SO₂ from the same stage after precipitating the treated acid in the settler. It is, therefore, substantially saturated with SO₂ soluble impurities at all times, the excess of these impurities being drawn out of tower 102 with the insolubles.

The second stage (high temperature) of scheme I is charged with a mixture of distilled SO₂ and clean recycle SO₂ from the first stage and settler. In scheme II, the second stage (low temperature) is charged with distilled SO₂.

Some minor exceptions to the above described purity of the respective SO₂ streams may be seen on the detailed flow diagrams, Figures 1 and 2, where necessary volume adjustments are made by transferring SO₂ between the respective stages.

Another difference between schemes I and II is the final source of treated acid. In scheme I, this acid is precipitated in the settler from an SO₂ stream that has been previously purified from SO₂ soluble impurities by countercurrent extraction in tower 2, followed by distillation. In scheme II, the treated acid is recovered by countercurrent extraction with distilled SO₂ in tower 142.

Still another difference in schemes I and II is the amount of compressor capacity required. Using the respective typical temperatures and pressures described for illustration, scheme I requires compression of SO₂ vapor from 10 lb./sq. in. absolute to 65 lb./sq. in. absolute pressure, whereas scheme II requires compression from 10 lbs. to some value less than 20 lbs. depending on the suction pressure of pump 182.

A further understanding of this invention may be had from the following illustrative examples in which all parts are by weight:

EXAMPLE I

This example illustrates the purification of acid sludge, obtained as a product of a hydrocarbon alkylation, under conditions designed to handle a large volume of acid sludge per unit time with a relatively low degree of purification per pass.

The acid sludge from a hydrocarbon alkylation having the following composition:

| | |
|---|---|
| Specific gravity, 60°/60° F | 1.75 |
| Analysis: Wt. per cent: | |
|   H₂SO₄ equiv. to titratable acidity | 88 |
|   H₂SO₄ equiv. to acidity of completely oxidized sample | 92 |
|   Carbon content | 5.3 | is treated in an apparatus of the type illustrated in Figure 1 and described above. The conditions of operation in the various steps of the treatment and the analysis of the products obtained are delineated in the table below.

EXAMPLE II

This example illustrates the treatment of acid sludge under conditions designed to purify a large volume of acid per unit time at a relatively low degree of purification per pass by another series of steps than those employed in Example I.

Acid sludge of the analysis indicated in Example I is treated by the series of steps of scheme II, described above, using the apparatus illustrated in Figure 2. The conditions of operation of the apparatus in the process as well as the results and analysis in the productions obtained in the treatment are delineated in the table below:

Table

|  | Example I | Example II |
|---|---|---|
| Operating Conditions: | | |
| Liq. Vol. Ratio of $SO_2$ to Acid Charge %— | | |
| First Stage Tower | 25 | 700 |
| Second Stage Tower | 700 | 10 |
| Temperature, °F.— | | |
| First Stage Tower (Top) | 20 | 60 |
| First Stage Tower (Bottom) | 20 | 80 |
| Second Stage Tower (Top) | 60 | 20 |
| Second Stage Tower (Bottom) | 80 | 20 |
| Acid Settler | 20 | 20 |
| Product Strippers | 80 | 80 |
| Pressure: Lb./Sq. In. Absolute (Approx.)— | | |
| First Stage Tower | 20 | 65 |
| Second Stage Tower | 65 | 20 |
| Acid Settler | 60 | 60 |
| Evaporator-Exchanger | 10 | 10 |
| Product Strippers | 7 | 7 |

| Yields and Qualities of Products: | Examples I and II |
|---|---|
| $SO_2$ Soluble Impurities— | |
| Yield, Wt. Per Cent of Charge | 5 |
| Specific Gravity, 60°/60° F | 1.73 |
| Analysis, Wt. Per Cent: | |
| $H_2SO_4$ Equiv. to Titratable Acidity | 70 |
| $H_2SO_4$ Equiv. to Acidity of Completely Oxidized Sample | 75 |
| Carbon Content | 27 |
| $SO_2$ Insoluble Impurities— | |
| Yield, Wt. Per Cent of Charge | 5 |
| Specific Gravity, 60°/60° F | 1.70 |
| Analysis, Wt. Per Cent: | |
| $H_2SO_4$ Equiv. to Titratable Acidity | 77 |
| $H_2SO_4$ Equiv. to Acidity of Completely Oxidized Sample | 90 |
| Carbon Content | 10 |
| Treated Acid— | |
| Yield, Wt. Per Cent of Charge | 90 |
| Specific Gravity, 60°/60° F | 1.76 |
| Analysis, Wt. Per Cent: | |
| $H_2SO_4$ Equiv. to Titratable Acidity | 90 |
| $H_2SO_4$ Equiv. to Acidity of Completely Oxidized Sample | 93 |
| Carbon Content | 4.0 |

The required ratios of liquid $SO_2$ circulated to acid sludge charged in the process depend in part on the type of acid sludge charged and the temperatures selected as being best suited for the degree of purification desired. For example, some acid sludges will contain a larger proportion of $SO_2$ soluble impurities than other acid sludges, possessing different solubilities in liquid $SO_2$, thus requiring different ratios of $SO_2$ to acid sludge to insure complete solution of these impurities. Apparently acid sludges obtained from severe treating of lubricating oils usually require higher ratios of $SO_2$ to sludge charged than acid sludges obtained from acid alkylation of butenes with isobutane.

While the present process may be used for the treatment of generally all acidic sludges, the process appears to be especially useful for purifying alkylation acid sludges, and the illustrations of quantities and qualities given herein will serve to show approximations of what may be expected by the process on this type of acid sludge. It should be noted that sulphuric acid alkylation processes normally operate with a system acidity (titratable strength) of 85 wt. percent to 90 wt. percent and that to maintain this acidity during alkylation, the fresh acid used as make-up must be appreciably stronger than the system acidity. If the major portion of this higher strength make-up acid is to be provided by continually or intermittently transferring a portion of the alkylation acid sludge from the alkylation system to the subject process, operated according to schemes I or II, for some degree of purification above its normal alkylation strength, and then to be returned to the alkylation system for make-up acidity, then it is obvious that the greater this degree of purification achieved, the less will be the quantity of transfer acid required per unit of time to and from the subject process. It is equally true that the higher the degree of purification required by the subject process, the greater will be the number of extraction stages required in each tower and the higher will be the ratio of $SO_2$ to acid in each tower. Other factors, such as temperatures and time of settling will also be affected by the degree of purification desired.

Hence, it is necessary, from an economic viewpoint, to weigh the advantages of (a) handling a larger volume of alkylation acid sludge charge per unit of time in the subject process and processing with a lower degree of purification against (b) handling a smaller volume of alkylation acid sludge charge with a higher degree of purification which entails, among other things, a higher ratio of $SO_2$ to acid in the extraction steps. Examples I and II above illustrate the former type of operation.

It is apparent from the discussion given above, that various temperatures may be employed in the step of contacting the acid sludge with liquid $SO_2$, so as to dissolve the acid contained in the sludge in the $SO_2$. This temperature should be as high as possible. However, it has been found desirable that the maximum operating temperature should be 100° F. or below, in view of the tendency of the acid sludges to decompose fairly rapidly in the presence of liquid $SO_2$ at temperatures above this figure. Maximum operating temperatures between 70° F. and 100° F. have been found to be preferable.

Similarly, it will be apparent that various temperatures may be employed for contacting the acid sludge with liquid sulphur dioxide so as to dissolve the $SO_2$ soluble impurities from the sludge without dissolving any appreciable quantity of acid. It is desirable for a maximum efficiency of the process to employ as low a temperature as possible in the step. However, in view of the tendency of acid sludges to solidify in the presence of liquid sulphur dioxide at temperatures below about 15° F., it is desirable to limit the minimum operating temperature to this figure. A minimum operating temperature between 15° F. and 30° F. has been found to be preferable.

The pressures employed in the various steps of my recovery and purification process depend primarily upon the temperatures employed in the procedure and upon the particular stage in the process. Where liquid sulphur dioxide is necessary in the procedure, a pressure sufficient to maintain the sulphur dioxide in the liquid phase at the prevailing temperature is employed. On the other hand, where it is necessary to vaporize the sulphur dioxide, a pressure is employed at which the sulphur dioxide will exit in the vapor phase under the prevailing temperature.

It has been found possible to increase the efficiency of the process described herein by the use of several modifications to the general procedure. Thus, oxidation of the acid sludge, either thermally or chemically, has been found to greatly increase the amount of $SO_2$ insoluble impurities which can be separated by the general procedure. However, the use of oxidation as a pretreatment to increase the purification of the acid from organic matter is accomplished at the expense of the conversion of a portion of the sulphuric acid to water and sulphur dioxide. Consequently, the extent of use of oxidation as pretreatment of the acid sludge will depend in part upon the ultimate purity desired in the purified acid and will be dictated by the economics of the process.

It has been found possible to increase the solubility of the $SO_2$ soluble impurities of the acid sludge in the liquid $SO_2$ by the addition of various solvents in minor proportions to the liquid $SO_2$. Benzene, ethyl ether and isopropyl ether are examples of such suitable promoters.

Various materials of construction resistant to the action of liquid sulphur dioxide and sulphuric acid may be employed for the construction of suitable apparatus for the subject process. However, since iron is the most economical material for this purpose, it is to be preferred in view of the fact that substantially no corrosion of iron processing equipment appears to take place in the operation of this process.

The subject purification procedure appears to be generally applicable to all acid sludges resulting from petroleum treatment procedures, although the process is particularly efficient in the purification of sulphuric acid sludges obtained in the alkylation of hydrocarbons. Any acid sludge to be treated by the process should be substantially free from entrained oils, particularly light hydrocarbons, in order to prevent the necessity of frequently purifying the process sulphur dioxide from the oils, since an accumulation of these materials in the sulphur dioxide appears to reduce the solvent power of the sulphur dioxide for the acid.

Local overheating and high isolated temperature in contact with used solvent or any of the products of my process should be avoided at all times, since the acid impurities are readily decomposed by excessive heat with the formation of undesirable water and coke. In connection with the presence of water in the process system, the presence of this material is harmful to the extent that it reduces the concentration of the acidity of the purified acid. For this reason, it has been found desirable to remove all oxide scale from the process equipment prior to the starting of the operation. This can be readily accomplished by the use of a warm 2 per cent aqueous phosphoric acid solution or a warm solution of 65 per cent sulphuric acid.

Small quantities of sulphur dioxide remain dissolved in the three-end products of my process and it is desirable to remove these last traces of dissolved sulphur dioxide. The use of strippers for this purpose has been indicated above and it has been found that a temperature of 80° F. and an absolute pressure of 15 inches of mercury may be successfully employed in the stripping operation.

A distinct advantage of my process resides in the efficiency of heat transfer and low heat requirements associated with the process. The apparatus described above and illustrated in Figures 1 and 2 has been designed to utilize this feature to the maximum. It has been found that the only refrigeration required by the process is that which is needed to overcome heat absorption by radiation and mechanical heat imparted by the pumps and compressors. Apparently, there is no appreciable amount of heat liberated during the steps of contact of acid sludge with liquid sulphur dioxide.

The majority of the discussion above has been concerned with the treatment of sulphuric acid sludges. However, the procedure is also applicable to other acid sludges resulting from petrolum treatment procedures. An example of another type of acidic sludge which may be treated is aluminum chloride sludges. In the treatment of such mixtures, some minor modifications to the general procedure are desirable, such as the addition of small quantities of petroleum naphtha to the sulphur dioxide used in the process in order to facilitate the precipitation of the complexes of aluminum chloride and $SO_2$ without requiring the use of abnormally low temperatures.

The present procedure provides an efficient and economical method for the purification of acidic sludges resulting from petroleum treatment procedures. The process is particularly useful in the treatment of sulphuric acid sludges, especially those resulting from hydrocarbon alkylations so as to purify the acid to a sufficient degree for recycle and re-use in the particular petroleum procedure. In addition, the method produces valuable by-product chemicals from the recovered $SO_2$ soluble and insoluble impurities produced during operation of the process. If it is not desired to recover the by-product chemicals from these materials, they may be hydrolyzed in any suitable fashion to recover any small amounts of sulphuric acid which they may contain.

What I claim is:

1. The process for the purification of acid which has previously been contacted with hydrocarbons and which is contaminated with some resultant reaction products soluble in sulfur-dioxide and some resultant reaction products not soluble in sulfur-dioxide, which comprises contacting liquid sulphur dioxide with the contaminated acid at a temperature below 30° F. in such proportions that no substantial quantity of the sulphuric acid is dissolved in the sulphur dioxide, further contacting said sulphuric acid with another portion of liquid sulphur dioxide at a temperature above 70° F. in such proportions that substantially all of the acid is dissolved in said sulphur dioxide, separating the resulting solution from the undissolved components of the impure acid, decreasing the temperature of the sulphur dioxide solution to a value below 30° F., separating the sulphuric acid precipitated from the solution by the cooling operation and recovering the separated acid.

2. The process for the purification of sulphuric acid which has previously been contacted with hydrocarbons and which is contaminated with some resultant reaction products soluble in sulfur-dioxide and some resultant reaction products not soluble in sulfur-dioxide, which comprises dissolving the contaminated acid in liquid sulphur dioxide of a temperature above 70° F., separating the resulting solution from the undissolved components of the impure acid, cooling the separated solution to a temperature below 30° F. to precipitate the sulphuric acid therefrom, separating the precipitated acid from the sulphur dioxide and recovering the separated, purified sulphuric acid.

3. The process for the purification of sulfuric acid which has previously been contacted with hydrocarbons and which contains some reaction products soluble in sulfur-dioxide and some reaction products not soluble in sulfur dioxide which comprises extracting sulfur-dioxide-soluble reaction products from the sulfuric acid with sulfur dioxide at a temperature not substantially above 20° F.; separating the sulfur-dioxide extractant and its charge of sulfur-dioxide-soluble reaction products from the extracted sulfuric acid; evaporating the sulfur-dioxide extractant, thereby recovering the sulfur-dioxide and separately obtaining the sulfur-dioxide-soluble reaction products; extracting the sulfuric acid a second time with sulfur dioxide at a temperature not substantially below 70° F., thereby effecting substantially complete solution of the sulfuric acid in the sulfur-dioxide while not dissolving the remaining reaction products present in the sulfuric acid; separating the solution of sulfuric acid and sulfur-dioxide from the undissolved reaction products, thereby separately obtaining the sulfur-dioxide-insoluble reaction products; and evaporating the sulfur-dioxide from the sulfuric acid, thereby recovering the sulfur-dioxide and separately obtaining purified sulfuric acid.

4. The process for the purification of sulfuric acid which has previously been contacted with hydrocarbons and which acid contains some reaction products soluble in sulfur-dioxide and some reaction products not soluble in sulfur-dioxide which comprises: extracting the sulfuric acid with sulfur-dioxide at a temperature not substantially below 70° F. to effect substantially complete solution of the sulfuric acid and such reaction products present therein as are soluble in sulfur-dioxide, while not dissolving all impurities of the sulfuric acid; separating the solution of sulfuric acid and sulfur-dioxide and sulfur-dioxide-soluble reaction products from the undissolved reaction products, thereby separately obtaining the sulfur-dioxide insoluble reaction products; lowering the temperature of the solution of sulfuric acid and sulfur-dioxide and sulfur-dioxide-soluble reaction products to a temperature of the order of 20° F. or lower and thereby precipitating the sulfuric acid and most of the reaction products from the sulfur-dioxide; subjecting the precipitated sulfuric acid and impurities to a second extraction with redistilled sulfur-dioxide at a temperature of the order of 20° F. or lower to further extract the sulfur-dioxide-soluble impurities from the sulfuric acid; and settling the sulfuric acid from the sulfur-dioxide and sulfur-dioxide-soluble impurities, and thereby separately obtaining the purified sulfuric acid; and evaporating the sulfur-dioxide extractant, thereby recovering the sulfur-dioxide and separately obtaining the sulfur-dioxide-soluble impurities.

LESLIE U. FRANKLIN.

REFERENCES CITED

The following references are of record in the file of this patent:

UNITED STATES PATENTS

| Number | Name | Date |
| --- | --- | --- |
| 911,553 | Edeleanu | Feb. 2, 1909 |
| 1,409,590 | Salathe | Mar. 14, 1922 |

OTHER REFERENCES

Chemical Refining of Petroleum, Kalichevsky and Stagner, A. C. S. Monograph Series, 2nd edition, No. 63 (pages 312 and 225).

Certificate of Correction

Patent No. 2,562,608

July 31, 1951

LESLIE U. FRANKLIN

It is hereby certified that error appears in the printed specification of the above numbered patent requiring correction as follows:

Column 1, line 52, for "difficulty" read *difficultly*; column 5, line 64, for "suphur" read *sulphur*; column 12, line 30, after "of" insert *sulphuric*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*